US012034237B2

(12) United States Patent
Hashiguchi

(10) Patent No.: US 12,034,237 B2
(45) Date of Patent: Jul. 9, 2024

(54) FIXING DEVICE, FIXING METHOD, CABLE ASSEMBLY AND STRUCTURAL BODY

(71) Applicant: JAPAN AVIATION ELECTRONICS INDUSTRY, LIMITED, Tokyo (JP)

(72) Inventor: Osamu Hashiguchi, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 678 days.

(21) Appl. No.: 17/089,831

(22) Filed: Nov. 5, 2020

(65) Prior Publication Data

US 2021/0226360 A1 Jul. 22, 2021

(30) Foreign Application Priority Data

Jan. 16, 2020 (JP) ................................ 2020-005364

(51) Int. Cl.
*H01R 11/32* (2006.01)
*H01R 4/06* (2006.01)
(Continued)

(52) U.S. Cl.
CPC ............... *H01R 11/32* (2013.01); *H01R 4/06* (2013.01); *H01R 4/185* (2013.01); *H01R 43/04* (2013.01); *H01R 43/16* (2013.01)

(58) Field of Classification Search
CPC .......... H01R 11/32; H01R 12/53; H01R 4/06; H01R 4/184; H01R 4/185; H01R 43/04; H01R 43/16
See application file for complete search history.

(56) References Cited

U.S. PATENT DOCUMENTS 4,168,394 A * 9/1979 Yuey .................... G21C 17/116 277/318
4,371,230 A * 2/1983 Inoue ..................... H01R 11/12 439/907

(Continued)

FOREIGN PATENT DOCUMENTS

JP S607077 A 1/1985
JP H03118589 U 12/1991

(Continued)

OTHER PUBLICATIONS

Japanese Office Action (and an English language translation thereof) dated Jul. 26, 2023, issued in counterpart Japanese Application No. 2020-005364.

(Continued)

*Primary Examiner* — Timothy J Thompson
*Assistant Examiner* — Rhadames Alonzo Miller
(74) *Attorney, Agent, or Firm* — Holtz, Holtz & Volek PC

(57) ABSTRACT

A fixing device is used to fix a cable to a substrate. The cable has a first conductor and a second conductor. The substrate has a first substrate fixing portion and a second substrate fixing portion which corresponding to the first conductor and the second conductor, respectively. The fixing device has a first electrode portion, a second electrode portion and a coupling portion which connects the first electrode portion and the second electrode portion to each other. The first electrode portion has a first connection portion to be connected to the first conductor and a first fixing portion to be connected to the first substrate fixing portion. The second electrode portion has a second connection portion to be connected to the second conductor and a second fixing portion to be connected to the second substrate fixing portion.

8 Claims, 6 Drawing Sheets

(51) Int. Cl.
*H01R 4/18* (2006.01)
*H01R 43/04* (2006.01)
*H01R 43/16* (2006.01)

(56) References Cited

U.S. PATENT DOCUMENTS 4,565,093 A * 1/1986 Jurva .................. H01M 50/186 73/40.7
4,593,970 A * 6/1986 Rhodes ................ G02B 6/4428 174/70 S
4,678,868 A * 7/1987 Kraska ................... H01B 17/30 228/124.6
4,727,223 A * 2/1988 Lee ........................ H01B 17/30 376/463
4,890,152 A * 12/1989 Hirata .................... H05K 3/306 257/713
5,144,412 A * 9/1992 Chang .................. H05K 7/1084 361/783
6,056,585 A 5/2000 Hatakeyama et al.
6,074,243 A * 6/2000 Edwards .............. H01R 11/281 439/504
6,334,797 B1 * 1/2002 Liang ..................... H01R 11/32 439/763
6,364,720 B1 * 4/2002 Liang ................... H01R 11/281 439/764
6,372,990 B1 4/2002 Saito et al.
7,458,861 B1 * 12/2008 Eke .......................... H01R 4/64 439/97
8,872,726 B2 10/2014 Kusanagi
9,124,045 B2 9/2015 Shiratori et al.
9,490,591 B2 11/2016 Yamashita et al.
2003/0027038 A1 * 2/2003 Tsukamoto ......... H01M 50/169 429/122
2003/0081370 A1 * 5/2003 Haskell .................... H01G 4/35 361/306.1
2004/0040734 A1 * 3/2004 Fujii ...................... H01R 11/12 174/84 C
2004/0101746 A1 * 5/2004 Ota ..................... H01M 50/529 429/332
2006/0079138 A1 * 4/2006 Zhao ...................... H01R 11/12 439/883
2007/0117471 A1 * 5/2007 Wagner .................. H01R 11/32 439/755
2008/0294220 A1 * 11/2008 Stevenson ............ A61N 1/3754 607/36
2009/0120686 A1 * 5/2009 Paterek .................... H01R 9/16 174/650
2010/0304120 A1 * 12/2010 Tokudome ............. C09D 5/028 524/588
2012/0067240 A1 * 3/2012 Hartl ....................... F42B 3/198 102/202
2013/0316600 A1 * 11/2013 Hung ..................... H01R 11/32 439/884
2014/0206223 A1 * 7/2014 Saitou ...................... H01R 4/64 439/386
2017/0089965 A1 * 3/2017 Klapper ............... G01R 31/327
2017/0170580 A1 * 6/2017 Ishihara ................... H01R 4/34
2017/0194722 A1 * 7/2017 Naganishi .............. H01R 4/186
2017/0201051 A1 * 7/2017 Yamamoto ............. H01R 4/188
2017/0310019 A1 * 10/2017 Yamamoto ............. H01R 11/32
2017/0310026 A1 * 10/2017 Matsui ..................... H01R 4/18
2017/0317457 A1 * 11/2017 Baker .................. H01R 25/162
2018/0175521 A1 * 6/2018 Bugaris .................. H01R 11/26
2018/0183156 A1 * 6/2018 Wang ................... H01R 13/518
2018/0219309 A1 * 8/2018 Okazaki ................. H01R 4/185
2018/0261953 A1 * 9/2018 Takahashi .............. H01G 11/10
2018/0351267 A1 * 12/2018 Yamamoto ............. H01R 11/32
2019/0199079 A1 * 6/2019 Specht ................. H01R 43/048
2021/0050681 A1 * 2/2021 Blakborn ............... H01R 11/09

FOREIGN PATENT DOCUMENTS

JP H0749730 Y2 11/1995
JP H11204175 A 7/1999
JP 2000323213 A 11/2000
JP 2001510934 A 8/2001
JP 2004139942 A * 5/2004 ........... H01R 13/405
JP 2011019178 A 1/2011
JP 2013122845 A 6/2013
JP 2016031780 A 3/2016

OTHER PUBLICATIONS

Japanese Office Action (and an English language translation thereof) dated Nov. 8, 2023, issued in counterpart Japanese Application No. 2020-005364.

* cited by examiner

FIXING DEVICE, FIXING METHOD, CABLE ASSEMBLY AND STRUCTURAL BODY

CROSS REFERENCE TO RELATED APPLICATIONS

This application is based on and claims priority under 35 U.S.C. § 119 to Japanese Patent Application No. JP2020-005364 filed Jan. 16, 2020, the contents of which are incorporated herein in their entirety by reference.

BACKGROUND OF THE INVENTION

This invention relates to a fixing device, particularly, to a fixing device for fixing a cable to a substrate. In addition, the present invention relates to a method for fixing a cable to a substrate by means of the fixing device, a cable assembly manufactured in process of the fixing method and a structural body manufactured by the fixing method.

JP2000-323213A (Patent Document 1) discloses a fixing device (a terminal for a coaxial cable) for fixing a coaxial cable to a substrate.

As shown in FIG. 11, a fixing device 70 disclosed in Patent Document 1 is connected to an external conductor (a second conductor) 82 of a coaxial cable (a cable) 80 and connected and fixed to a substrate 90. A central conductor (a first conductor) 84 of the coaxial cable 80 is connected and fixed to the substrate 90 independently of the fixing device 70.

SUMMARY OF THE INVENTION

The fixing device 70 disclosed in Patent Document 1 is for connecting the external conductor 82 of the coaxial cable 80 and the substrate 90 to each other and independent of the central conductor 84. Accordingly, in order to connect the coaxial cable 80 to the substrate 90 by means of the fixing device 70, it is necessary to perform a process of processing the central conductor 84 and a process of connecting and fixing the central conductor 84 to the substrate 90 in addition to a process of connecting and fixing the fixing device 70 to the substrate 90. Thus, there is a problem that the processes are complex in the fixing method of Patent Document 1 for fixing the coaxial cable 80 to the substrate 90 by means of the fixing device 70.

It is therefore an object of the present invention to provide a fixing device which is for fixing a cable to a substrate and capable of simplifying a process of fixing the cable to the substrate. In addition, the present invention provides a fixing method for fixing the cable to the substrate by means of the fixing device. Furthermore, the present invention provides a cable assembly and a structural body which are fabricated by the fixing method.

One aspect of the present invention provides a fixing device which fixes a cable to a substrate. The cable has a first conductor and a second conductor. The substrate has a first substrate fixing portion and a second substrate fixing portion which correspond to the first conductor and the second conductor, respectively. The fixing device comprises a first electrode portion, a second electrode portion, a coupling portion which couples the first electrode portion and the second electrode portion to each other. The first electrode portion is used to connect the first conductor and the first substrate fixing portion to each other. The first electrode portion has a first connection portion to be connected to the first conductor and a first fixing portion to be connected and fixed to the first substrate fixing portion. The second electrode portion is used to connect the second conductor and the second substrate fixing portion to each other. The second electrode portion has a second connection portion to be connected to the second conductor and a second fixing portion to be connected to the second substrate fixing portion.

A second aspect of the present invention provides a method for fixing the cable to the substrate by means of the fixing device mentioned above. The fixing method comprises: connecting the first connection portion and the second connection portion to the first conductor and the second conductor, respectively, and cutting off the coupling portion; and connecting and fixing the first fixing portion and the second fixing portion to the first substrate fixing portion and the second substrate fixing portion, respectively.

A third aspect of the present invention provides a cable assembly which is fabricated during execution of the method mentioned above. The cable assembly comprises the cable, the first electrode portion and the second electrode portion. Each of the first electrode portion and the second electrode portion has a cut mark.

A fourth aspect of the present invention provides a method for fixing the cable to the substrate by means of the fixing device mentioned above. The fixing method comprises: connecting the first connection portion and the second connection portion to the first conductor and the second conductor, respectively; connecting and fixing the first fixing portion and the second fixing portion to the first substrate fixing portion and the second substrate fixing portion, respectively; and after the connecting and fixing, cutting off the coupling portion.

A fifth aspect of the present invention provides a structural body which is manufactured by the method mentioned above. The structural body comprises the cable, the substrate, the first electrode portion and the second electrode portion. Each of the first electrode portion and the second electrode portion has a cut mark.

In the fixing device according to the first aspect of the present invention, the first electrode portion and the second electrode portion are coupled to each other by means of the coupling portion. With this structure, attaching the first electrode portion to the cable and attaching the second electrode portion to the cable can be carried out in the same process. In other words, a process of connecting the first connection portion of the first electrode portion to the first conductor of the cable and a process of connecting the second connection portion of the second electrode portion to the second conductor of the cable can be carried out at the same time.

Moreover, in the fixing device according to the first aspect of the present invention, the first electrode portion and the second electrode portion have the first fixing portion and the second fixing portion, respectively, which correspond to the first substrate fixing portion of the substrate and the second substrate fixing portion of the substrate, respectively. By using the first fixing portion and the second fixing portion, connecting and fixing the first electrode portion to the substrate and connecting and fixing the second electrode portion to the substrate can be carried out in the same process. Accordingly, provided that the first electrode portion and the second electrode portion are connected to the first conductor of the cable and the second conductor of the cable, respectively, a process of connecting and fixing the first conductor of the cable to the substrate and a process of connecting and fixing the second conductor of the cable to the substrate can be carried out at the same time.

As mentioned above, by using the fixing device according to the first aspect of the present invention, fixation of the first conductor of the cable to the substrate and fixation of the second conductor of the cable to the substrate can be carried out in the same process at the same time. Thus, the process of fixing the cable to the substrate can be simplified.

An appreciation of the objectives of the present invention and a more complete understanding of its structure may be had by studying the following description of the preferred embodiment and by referring to the accompanying drawings.

Figure 1:
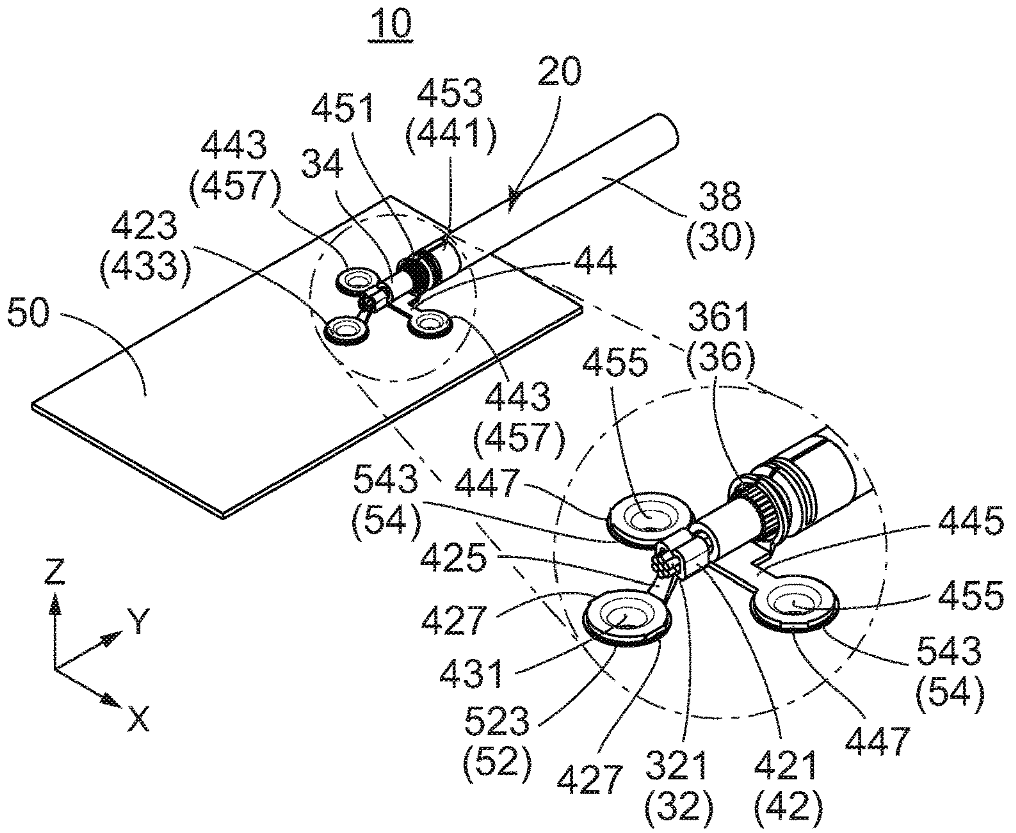
FIG. 1 is a top, perspective view showing a structural body according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DESCRIPTION OF PREFERRED EMBODIMENTS

Figure 2:
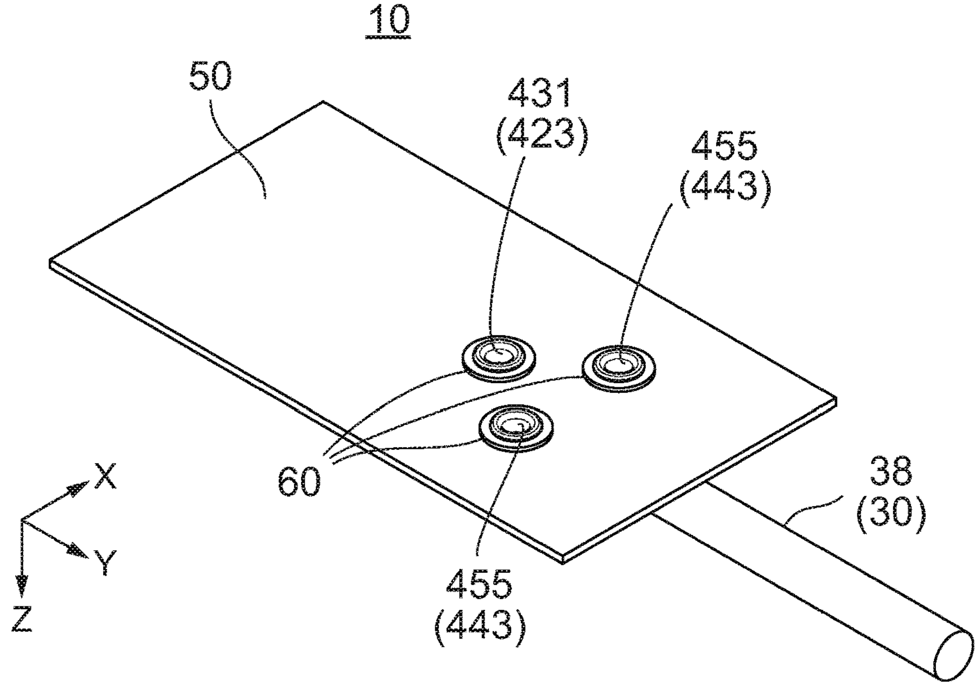
FIG. 2 is a bottom, perspective view showing the structural body of FIG. 1.
Figure 3:
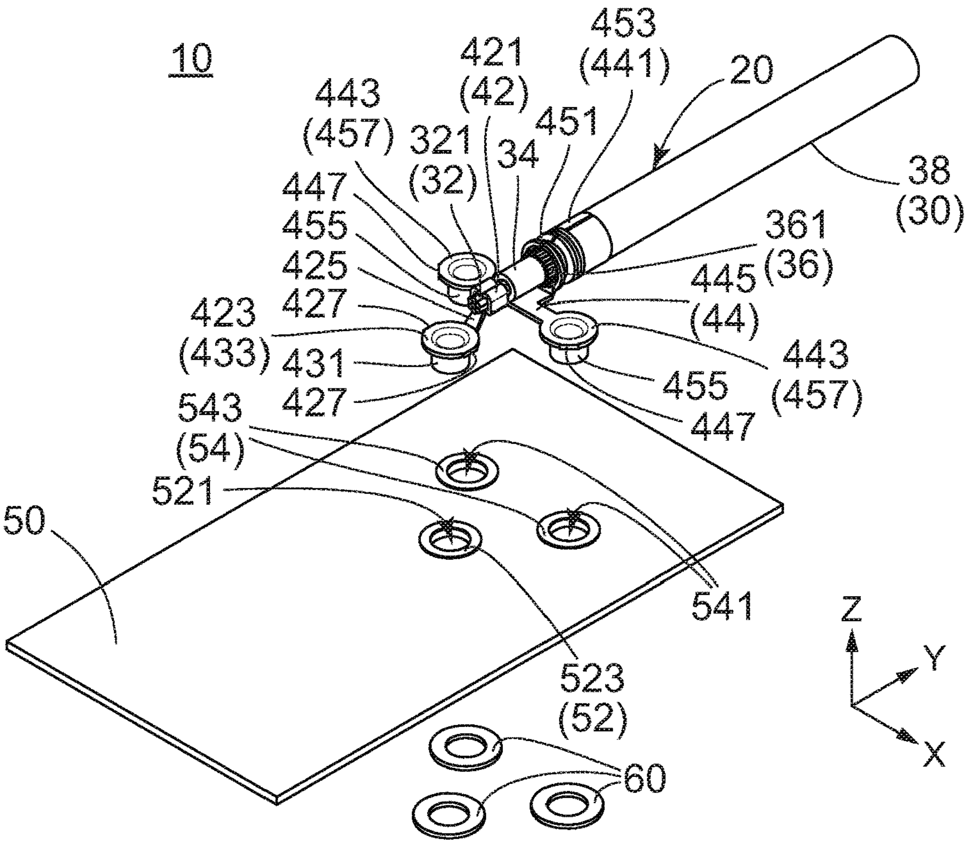
FIG. 3 is an exploded, perspective view showing the structural body of FIG. 1.

Referring to FIGS. 1 to 3, a structural body 10 according to an embodiment of the present invention has a cable assembly 20, a substrate 50 and washers 60.

As understood from FIG. 3, the cable assembly 20 has a cable 30, a first electrode portion 42 and a second electrode portion 44. The cable 30 has a first conductor 32 and a second conductor 36. The substrate 50 has a first substrate fixing portion 52 which corresponds to the first conductor 32 and two second substrate fixing portions 54 which correspond to the second conductor 36. The first electrode portion 42 connects the first conductor 32 of the cable 30 to the first substrate fixing portion 52 of the substrate 50. The second electrode portion 44 connects the second conductor 36 of the cable 30 to the second substrate fixing portions 54 of the substrate 50.

Figure 4:
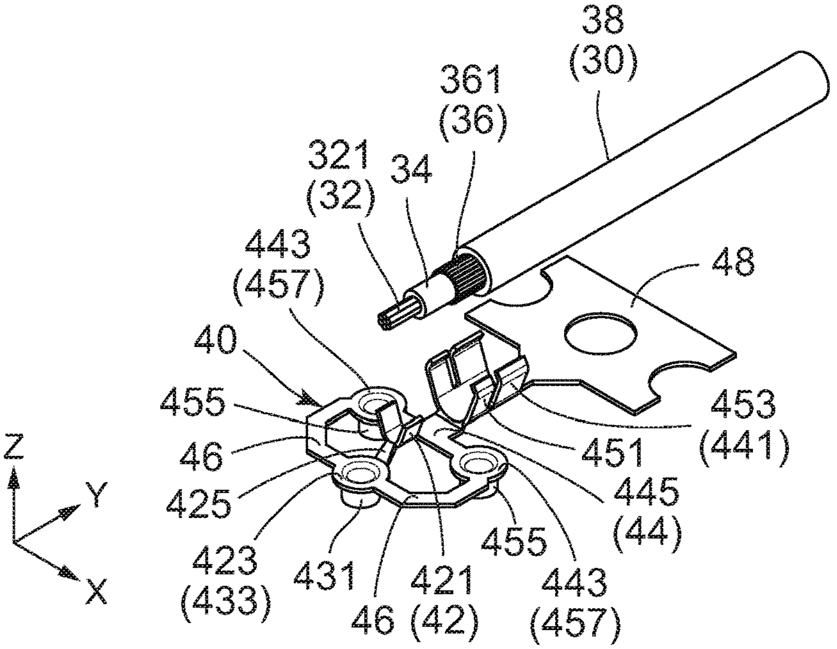
FIG. 4 is a diagram for describing an assembly process of a cable assembly included in the structural body of FIG. 3 or a top, perspective view showing a cable and a fixing device. The fixing device has not been attached to the cable yet but remains integral with a carrier.
Figure 5:
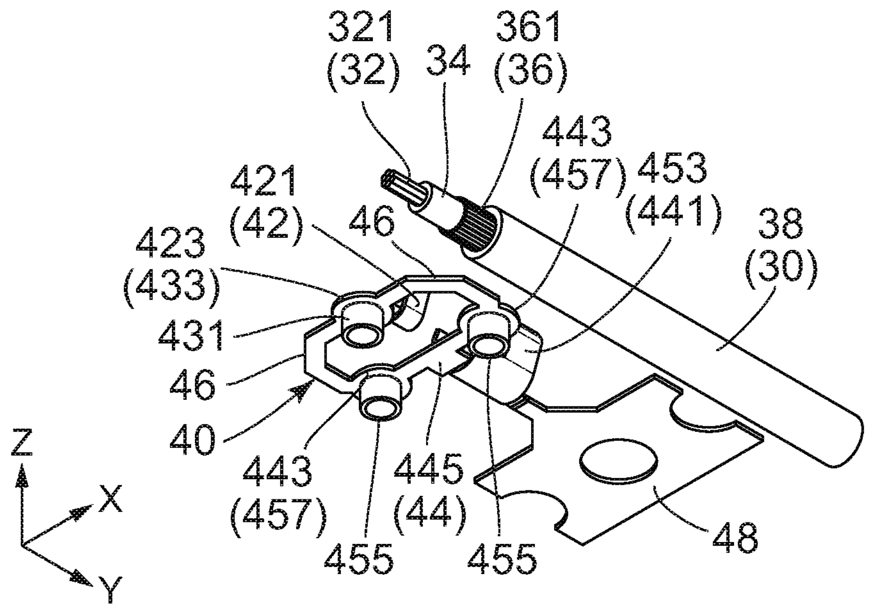
FIG. 5 is a bottom, perspective view showing the cable and the fixing device of FIG. 4.

As understood from FIGS. 4 and 5, the cable 30 is a coaxial cable in the present embodiment. In detail, the cable 30 is provided with a central conductor (the first conductor) 32, an insulator 34, an external conductor (the second conductor) 36 and an outer sheath 38 which are concentrically arranged. However, the present invention is not limited thereto. The cable 30 may be a double conductor cable. In other words, the cable 30 should have the first conductor 32 and the second conductor 36. In the present embodiment, the central conductor 32 consists of a plurality of conducting wires. The insulator 34 covers a periphery of the conducting wires forming the central conductor 32 to insulate the central conductor 32 from the external conductor 36. The external conductor 36 consists of a plurality of conductive wires and is arranged to cover a periphery of the insulator 34. The outer sheath 38 covers a periphery of the conductive wires forming the external conductor 36.

As shown in FIGS. 4 and 5, the central conductor 32 of the cable 30 is exposed outside in part. In detail, an end portion 321 of the central conductor 32 is exposed outside. Also, the external conductor 36 is exposed in part from the outer sheath 38. In detail, an end portion (exposed portion) 361 of the external conductor 36 is located rearward of the end portion 321 of the central conductor 32 in a front-rear direction and exposed outside. In the present embodiment, the front-rear direction is a Y-direction. A negative Y-direction is directed forward while a positive Y-direction is directed to rearward.

As understood from FIGS. 4 and 5, each of the first electrode portion 42 and the second electrode portion 44 is a part of fixing device 40. The fixing device 40 is made of a single metal sheet and formed integrally with a carrier 48.

Figure 7:
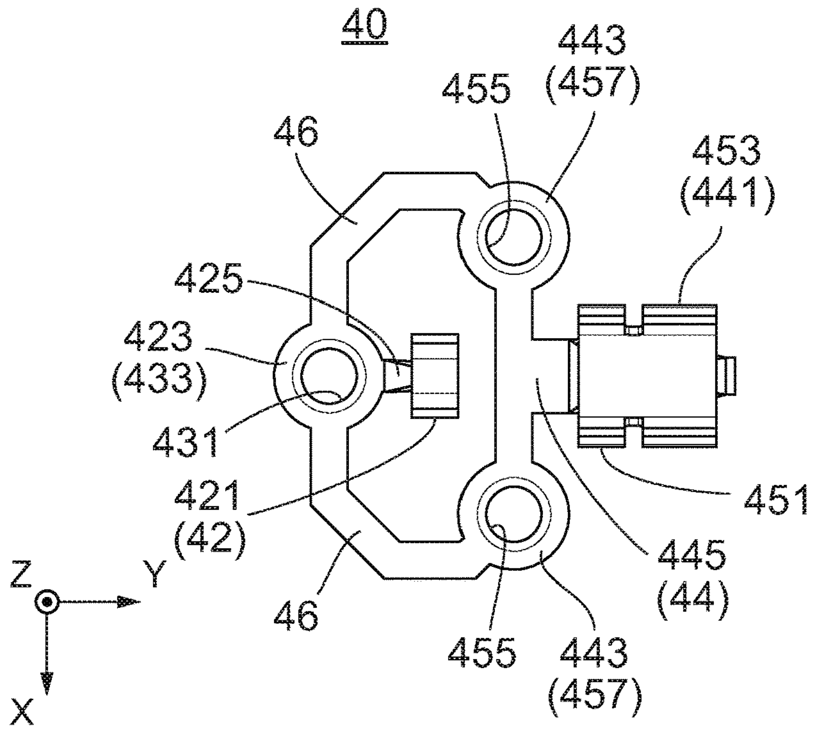
FIG. 7 is a plane view showing the fixing device of FIG. 4. The carrier is cut off from the fixing device.

Referring to FIG. 7, the fixing device 40 has the first electrode portion 42, the second electrode portion 44 and two coupling portions 46. Each of the coupling portions 46 couples the first electrode portion 42 to the second electrode portion 44. The coupling portions 46 are cut off before completion of assembling the cable assembly 20 or assembling the structural body 10. As understood from FIG. 3, the coupling portions 46 are cut off before the completion of assembling the cable assembly 20 in the present embodiment. As a result of cutting off the coupling portions 46, cut marks 427 remain on the first electrode portion 42, and cut marks 447 remain on the second electrode portion 44.

As shown in FIG. 7, the first electrode portion 42 has a first connection portion 421, a first fixing portion 423 and a first connecting portion 425. As described later, the first connection portion 421 is connected to the first conductor 32 (see FIG. 3), and the first fixing portion 423 is connected and fixed to the first substrate fixing portion 52 (see FIG. 3). The first connecting portion 425 connects the first connection portion 421 to the first fixing portion 423. The second electrode portion 44 has a second connection portion 441, two second fixing portions 443 and a second connecting portion 445. As described later, the second connection portion 441 is connected to the second conductor 36 (see FIG. 3), and the second fixing portions 443 are connected to the second substrate fixing portions 54 (see FIG. 3), respectively. The second connecting portion 445 connects the second connection portion 441 to the second fixing portions 443. In the present embodiment, the second electrode portion 44 has two of the second fixing portions 443. However, the present invention is not limited thereto. The number of the second fixing portion 443 may be one.

As shown in FIG. 4, the first connection portion 421 of the first electrode portion 42 of the fixing device 40 has an open barrel shape. The second connection portion 441 of the second electrode portion 44 of the fixing device 40 has a front portion 451 and a rear portion 453 each of which has an open barrel shape. As understood from FIG. 6, the first connection portion 421 corresponds to the end portion 321 of the central conductor 32. The front portion 451 of the second connection portion 441 corresponds to the end portion 361 of the external conductor 36. The rear portion 453 of the second connection portion 441 corresponds to the outer sheath 38 located in the vicinity of the end portion 361.

As shown in FIG. 7, the coupling portions 46 of the fixing device 40 correspond to the second fixing portions 443, respectively, in the present embodiment. Each of the coupling portions 46 connects the first fixing portion 423 to the second fixing portion 443 corresponding thereto. However, the present invention is not limited thereto. The coupling portions 46 may connect any part of the first electrode portion 42 to any part of the second electrode portion 44, provided that the coupling portions 46 connect the first electrode portion 42 to the second electrode portion 44. The number of the coupling portion 46 may be one. However, when the number of the coupling portions 46 is two, greater effect can be obtained on prevention or suppression of deformation caused in the fixing device 40 by an unexpected external force during the assembly process thereof.

As understood from FIG. 3, the first connection portion 421 of the fixing device is crimped and connected to the end portion 321 of the central conductor 32 of the cable 30. The second connection portion 441 is crimped and connected to the external conductor 36 and the outer sheath 38 of the cable 30. In detail, the front portion 451 of the second connection portion 441 is crimped and connected to the end portion 361 of the external conductor 36 of the cable 30. The rear portion 453 of the second connection portion 441 is crimped and connected to a part of the cable 30 which is covered with the outer sheath 38.

As shown in FIG. 3, the substrate 50 is provided with the first substrate fixing portion 52 and two of the second substrate fixing portions 54. The first substrate fixing portion 52 corresponds to the first fixing portion 423 of the fixing device 40. The second substrate fixing portions 54 correspond to the second fixing portions 443 of the fixing device 40, respectively. The first substrate fixing portion 52 has a hole 521 piercing the substrate 50 in an up-down direction and a connecting pattern 523. The connecting pattern 523 is formed in a ring-shape on a surface of the substrate 50 to surround the hole 521. The connecting pattern 523 is connected to something (not shown), such as a wiring, formed on the surface of the substrate 50. Similarly, each of the second substrate fixing portions 54 has a hole 541 piercing the substrate 50 in the up-down direction and a connecting pattern 543. Each of the connecting patterns 543 is formed in a ring-shape on the surface of the substrate 50 to surround the hole 541 corresponding thereto. Each of the connecting patterns 543 is connected to something (not shown), such as a wiring, formed on the surface of the substrate 50. In the present embodiment, the up-down direction is a Z-direction.

Figure 8:
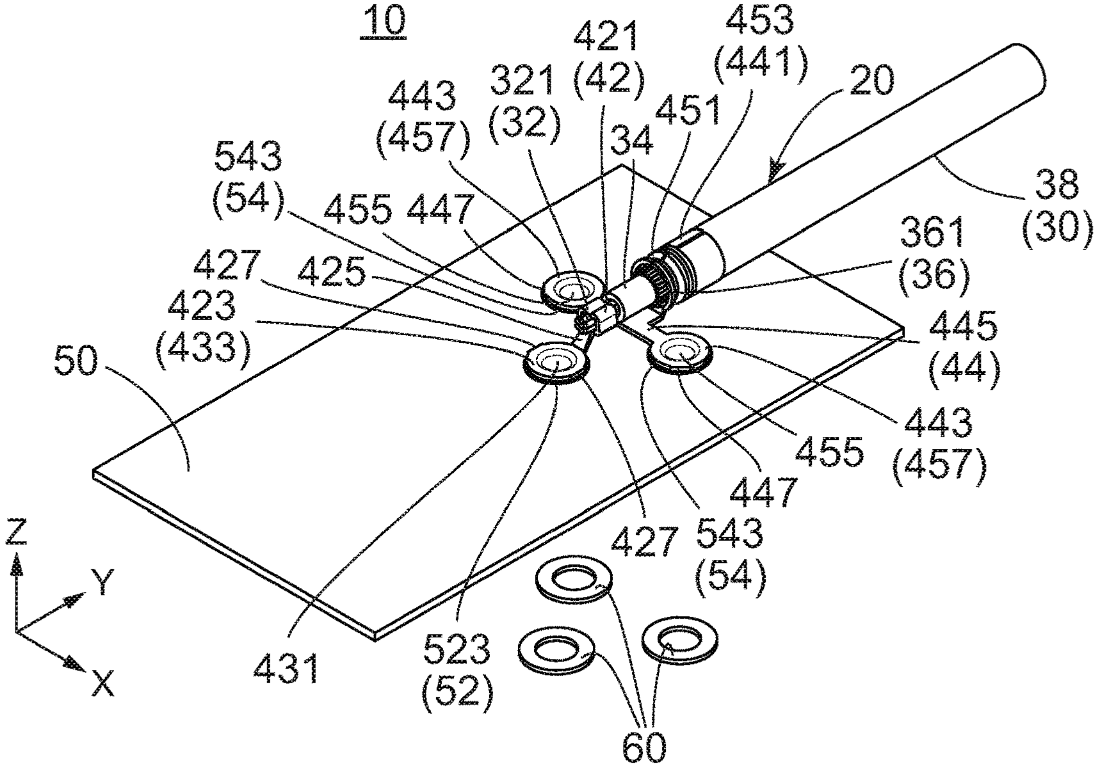
FIG. 8 is a top, perspective view for describing an assembly process of the structural body of FIG. 3. The cable assembly is combined with a substrate. Washers are not combined with the cable assembly.
Figure 9:
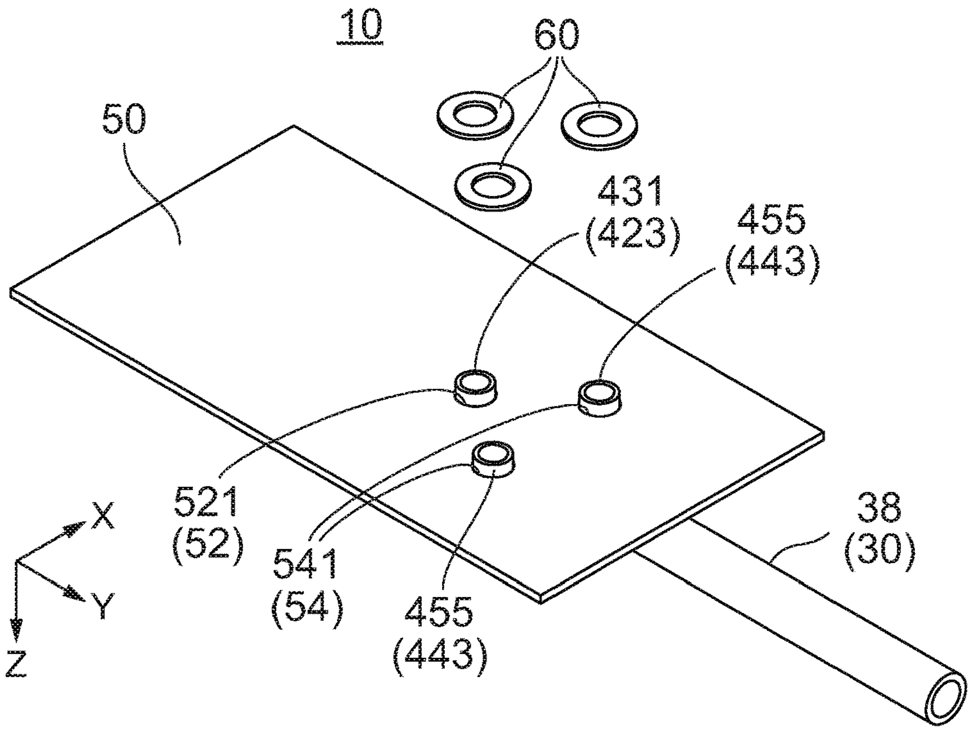
FIG. 9 is a bottom, perspective view for describing the assembly process of the structural body of FIG. 3. The cable assembly is combined with the substrate. The washers are not combined with the cable assembly.

As understood from FIGS. 8 and 9, the first fixing portion 423 of the fixing device 40 has a shape insertable, at least in part, into the hole 521 of the first substrate fixing portion 52. Similarly, each of the second fixing portions 443 of the fixing device 40 has a shape insertable, at least in part, into the hole 541 of the second substrate fixing portion 54 corresponding thereto. Referring to FIG. 1 in addition to FIG. 10, the first fixing portion 423 has the shape which can be deformed to be connected and fixed to the first substrate fixing portion 52 after inserted into the hole 521. Similarly, each of the second fixing portions 443 has the shape which can be deformed to be connected and fixed to the second substrate fixing portion 54 corresponding thereto after inserted into the hole 541 corresponding thereto.

In detail, as understood from FIG. 5, each of the first fixing portion 423 and the second fixing portions 443 has an eyelet-shape in the present embodiment. In more detail, the first fixing portion 423 has a barrel portion 431 having a cylindrical shape and a flange portion 433 having a ring shape which extends radially outward from an upper end of the barrel portion 431. Similarly, each of the second fixing portions 443 has a barrel portion 455 having a cylindrical shape and a flange portion 457 having a ring shape which extends radially outward from an upper end of the barrel portion 455. In the present embodiment, the first fixing portion 423 and the second fixing portions 443 are the same as each other in size. However, the first fixing portion 423 may be different from the second fixing portions 443 in size.

As understood from FIGS. 3, 8 and 9, an external diameter of the barrel portion 431 of the first fixing portion 423 of the fixing device 40 is slightly smaller than an internal diameter of the hole 521 of the first substrate fixing portion 52. An external diameter of the flange portion 433 of the first fixing portion 423 is larger than the internal diameter of the hole 521 of the first substrate fixing portion 52. Similarly, an external diameter of the barrel portion 455 of the second fixing portion 443 of the fixing device 40 is slightly smaller than an internal diameter of the hole 541 of the second substrate fixing portion 54 corresponding thereto, and an external diameter of the flange portion 457 is larger than the internal diameter of the hole 541 of the second substrate fixing portion 54 corresponding thereto. Accordingly, the barrel portion 431 of the first fixing portion 423 is insertable into the hole 521 of the first substrate fixing portion 52. When the barrel portion 431 of the first fixing portion 423 is inserted into the hole 521 of the first substrate fixing portion 52, the flange portion 433 of the first fixing portion 423 can come in contact with the connecting pattern 523. In similar fashion, the barrel portions 455 of the second fixing portions 443 are insertable into the holes 541 of the second substrate fixing portions 54, respectively. When the barrel portions 455 of the second fixing portions 443 are inserted into the holes 541 of the second substrate fixing portions 54, respectively, the flange portions 457 of the second fixing portions 443 can come in contact with the connecting patterns 543, respectively.

Figure 10:
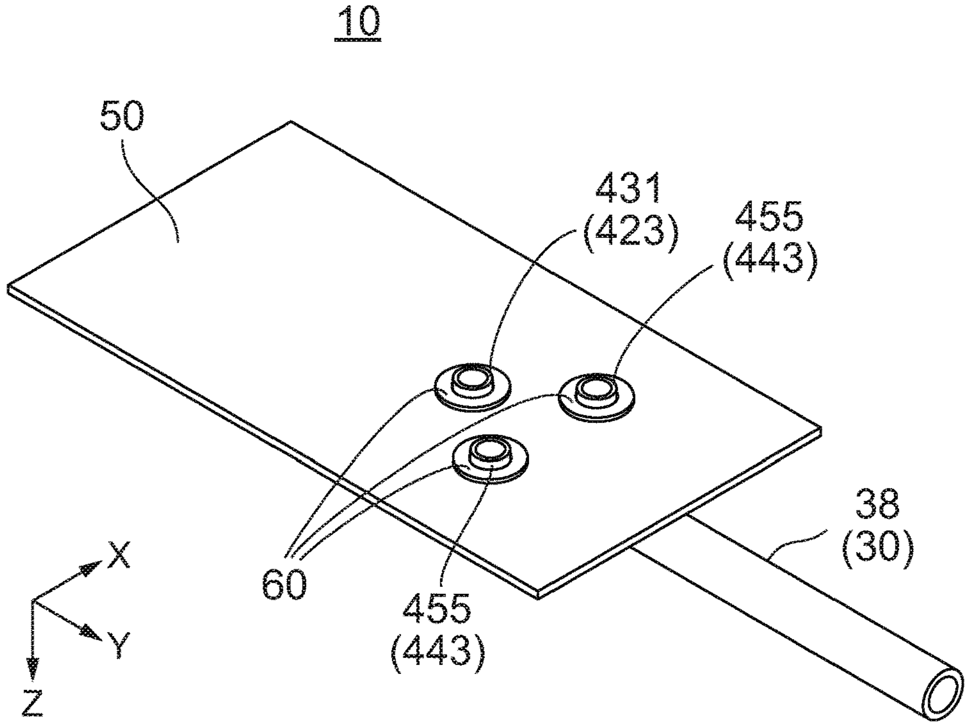
FIG. 10 is another bottom perspective view showing a process following the process shown in FIG. 9. The washers are combined with a first fixing portion and second fixing portions. The first fixing portion and the second fixing portions have not processed to deform them yet.
Figure 11:
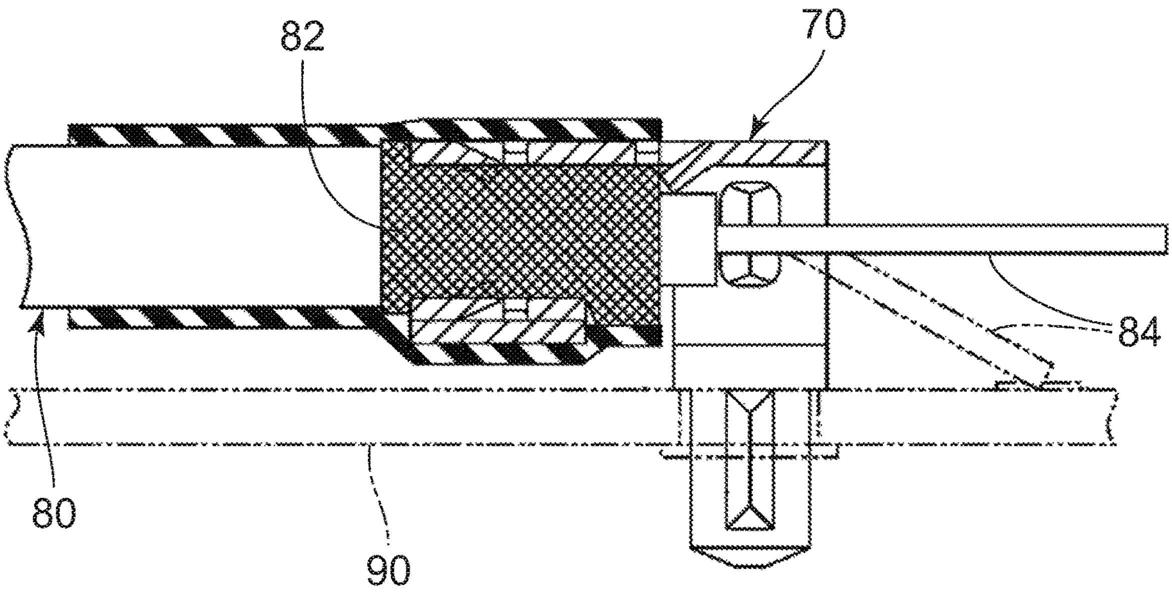
FIG. 11 PRIOR ART
FIG. 11 is a sectional side view showing a state that a coaxial cable is fixed to a substrate by means of a fixing device (a terminal for a coaxial cable) disclosed in Patent Document 1.

As shown in FIGS. 9 and 10, each of washers 60 has a ring shape. The washers 60 correspond to the first fixing portion 423 and the second fixing portions 443, respectively. An internal diameter of each of the washers 60 is slightly larger than an external diameter of the barrel portion 431 of the first fixing portion 423 corresponding thereto or the barrel portion 455 of the second fixing portion 443 corresponding thereto. With this structure, as shown in FIG. 10, the barrel portion 431 and the barrel portions 455 are insertable into the washers 60, respectively.

As understood from FIG. 2, each of the barrel portion 431 of the first fixing portion 423 and the barrel portions 455 of the second fixing portions 443 is deformed after inserted into the washer 60 corresponding thereto. As a result, the first fixing portion 423 and the second fixing portions 443 are connected and fixed to the substrate 50. Then, the flange portion 433 of the first fixing portion 423 comes into contact with and is connected to the connecting pattern 523 of the substrate 50. At the same time, the flange portions 457 of the second fixing portions 443 come into contact with and are connected to the connecting patterns 543 of the substrate 50, respectively. However, the present invention is not limited thereto. The barrel portion 431 of the first fixing portion 423 and the barrel portions 455 of the second fixing portions 443 may be connected and fixed to the substrate 50 by deforming them without using the washers 60.

Figure 6:
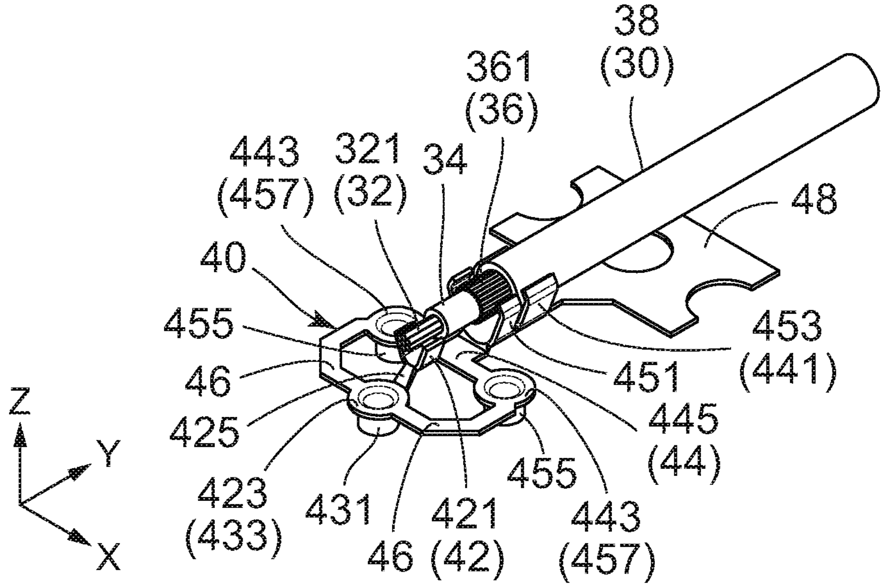
FIG. 6 is another top, perspective view showing the cable and the fixing device of FIG. 4. The cable is put on the fixing device but has not been fixed to the fixing device yet.

Hereinafter, the description will be made about a fixing method for fixing the cable 30 (see FIG. 6) to the substrate 50 (see FIG. 3) by the means of the fixing device (see FIG. 6).

First, the cable 30 (see FIG. 6) and the fixing device 40 (see FIG. 6) are provided. As shown in FIG. 6, each of the central conductor 32 and the external conductor 36 is previously exposed by a predetermined length at an end of the cable 30. Next, as shown in FIG. 6, the cable 30 is place on the fixing device 40 provided. Subsequently, the first connection portion 421 and the second connection portion 441 are crimped by means of a first press device (not shown), and the coupling portions 46 are cut off at that time. Simultaneously, the fixing device 40 (the second electrode portion 44) is cut apart from the carrier 48. Thus, the first electrode portion 42 of the fixing device 40 and the second electrode portion 44 of the fixing device 40 are attached to the cable 30 at a time in the same process. In detail, the first connection portion 421 is connected to the central conductor 32 while the front portion 451 of the second connection portion 441 is connected to the external conductor 36. Moreover, the rear portion 453 of the second connection portion 441 grasps the cable 30 over the outer sheath 38. Furthermore, the first electrode portion 42 and the second electrode portion 44 are separated from each other. In addition, the second electrode portion 44 is separated from the carrier 48. As just described, the cable assembly 20 (see FIG. 3) in which the first electrode portion 42 is connected to the first conductor (the central conductor) 32 and which the second electrode portion 44 is connected to the second conductor (the external conductor) 36 is completed.

Next, as shown in FIGS. 8 and 9, the barrel portion 431 of the first fixing portion 423 and the barrel portions 455 of the second fixing portions 443 are inserted into the hole 521 of the first substrate fixing portion 52 and the holes 541 of the second substrate fixing portions 54, respectively. As understood from FIG. 9, a size of each of the barrel portion 431 of the first fixing portion 423 and the barrel portions 455 of the second fixing portions 443 in the up-down direction is larger than a size (thickness) of the substrate 50 in the up-down direction. Accordingly, the barrel portion 431 of the first fixing portion 423 protrudes from the hole 521 of the first substrate fixing portion 52 in part on an undersurface of the substrate 50, and each of the barrel portions 455 of the second fixing portions 443 protrudes from the hole 541 of the second substrate fixing portion 54 corresponding thereto in part on the undersurface of the substrate 50.

Subsequently, as shown in FIG. 10, the washers 60 are attached to the barrel portion 431 of the first fixing portion 423 and the barrel portions 455 of the second fixing portions 443, where the barrel portion 431 and the barrel portions 455 protrude from the undersurface of the substrate 50. As shown in FIG. 10, each of the barrel portion 431 of the first fixing portion 423 and the barrel portions 455 of the second fixing portions 443 has a length enough to protrude in part from the washer 60 corresponding thereto in the up-down direction.

Next, as understood from FIG. 2 in addition to FIG. 10, the barrel portion 431 of the first fixing portion 423 and the barrel portions 455 of the second fixing portions 443 are deformed in part by means of a second press device (not shown). As a result, as shown in FIGS. 1 and 2, the first fixing portion 423 and the second fixing portions 443 are connected and fixed to the first substrate fixing portion 52 and the second substrate fixing portions 54, respectively. Thus, the structural body 10 in which the cable assembly 20 is connected and fixed to the substrate 50 is completed.

As understood from the description mentioned above, the fixing device 40 of the present embodiment is used to fix the cable 30 to the substrate 50. According to the present embodiment, by the process of attaching the fixing device 40 to the cable 30, the first electrode portion 42 and the second electrode portion 44 can be attached to the first conductor 32 of the cable 30 and the second conductor 36 of the cable 30, respectively, at a time in the same process. In addition, by the process of attaching the first electrode portion 42 and the second electrode portion 44 to the substrate 50, the first conductor 32 and the second conductor 36 can be connected and fixed to the first substrate fixing portion 52 and the second substrate fixing portions 54, respectively, at a time in the same process. In this manner, according to the present embodiment, connection and fixation of the first conductor 32 to the substrate 50 and connection and fixation of the second conductor 36 to the substrate 50 can be carried out at a time in the same process. Thus, use of the fixing device 40 according to the present embodiment can simplify attaching process of the cable 30 to the substrate 50. In addition, since the cable 30 can be connected and fixed to the substrate 50 without soldering, the present invention can be applied to the cable 30 and the substrate 50 each of which includes a part made of a low heat-resistant material.

Although the specific explanation about the present invention is made above referring to the embodiments, the present invention is not limited thereto but susceptible of various modifications and alternative forms without departing from the spirit of the invention. For example, in the aforementioned embodiment, cutting off the coupling portions 46 is carried out in the process that the first connection portion 421 and the second connection portion 441 are connected to the first conductor 32 and the second conductor 36, respectively. However, the cutting off the coupling portions 46 may be carried out after the process that the first fixing portion 423 and the second fixing portions 443 are connected and fixed to the first substrate fixing portion 52 and the second substrate fixing portions 54, respectively.

In the aforementioned embodiment, the fixing device 40 has two electrode portions, i.e. the first electrode portion 42 and the second electrode portion 44. However, the fixing device 40 may have three or more electrode portions in accordance with a structure of the cable 30. In that case, the electrode portions are connected to one another by means of coupling portions like the coupling portions 46. According to that structure, the fixing device 40 of the present invention can be applied to a multi-conductor cable having a plurality of conductors as the central conductors 32.

In the aforementioned embodiment, the first electrode portion 42 and the second electrode portion 44 are fixed to the substrate 50 without soldering. However, the first fixing portion 423 and the second fixing portions 443 may be soldered to the first substrate fixing portion 52 and the second substrate fixing portions 54, respectively, provided that the cable 30 and the substrate 50 are made of high heat-resistant materials. In that case, each of the first fixing portion 423, the second fixing portions 443, the first substrate fixing portion 52 and the second substrate fixing portions 54 can be simplified in structure.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A fixing device which fixes a cable to a substrate, wherein:

the cable has a first conductor and a second conductor;

the substrate has a first substrate fixing portion and a second substrate fixing portion which correspond to the first conductor and the second conductor, respectively;

the fixing device comprises a first electrode portion, a second electrode portion, and a coupling portion which couples the first electrode portion and the second electrode portion to each other;

the first electrode portion is used to connect the first conductor and the first substrate fixing portion to each other;

the first electrode portion has a first connection portion to be connected to the first conductor and a first fixing portion to be connected and fixed to the first substrate fixing portion;

the second electrode portion is used to connect the second conductor and the second substrate fixing portion to each other; and the second electrode portion has a second connection portion to be connected to the second conductor and a second fixing portion to be connected to the second substrate fixing portion, wherein:

each of the first substrate fixing portion and the second substrate fixing portion includes a hole piercing the substrate;

the first fixing portion has a shape which is insertable into the hole of the first substrate fixing portion and which is connectable and fixable to the first substrate fixing portion by being deformed after being inserted into the hole; and the second fixing portion has a shape which is insertable into the hole of the second substrate fixing portion and which is connectable and fixable to the second substrate fixing portion by being deformed after being inserted into the hole.

2. The fixing device as recited in claim 1, wherein:

each of the first connection portion and the second connection portion has an open barrel shape; and the first connection portion and the second connection portion are to be crimped and thereby be connected to the first conductor and the second conductor, respectively.

3. The fixing device as recited in claim 2, wherein:

the cable is a coaxial cable which comprises a central conductor and an external conductor;

the first conductor is the central conductor;

the second conductor is the external conductor;

the cable further comprises an outer sheath which covers the second conductor;

the second conductor has an exposed portion which is exposed from the outer sheath in part; and the second connection portion is to be crimped and thereby be connected to the exposed portion and the outer sheath.

4. The fixing device as recited in claim 1, wherein the coupling portion couples the first fixing portion and the second fixing portion to each other.

5. The method of fixing a cablr to a substrate using the fixing device as recited in claim 1, the fixing method comprising:

connecting the first connection portion and the second connection portion to the first conductor and the second conductor, respectively, and cutting off the coupling portion; and connecting and fixing the first fixing portion and the second fixing portion to the first substrate fixing portion and the second substrate fixing portion, respectively.

6. A cable assemble which is fabricated during execution of the method as recited in claim 5, wherein:

the cable assembly comprises the cable, the first electrode portion, and the second electrode portion; and each of the first electrode portion and the second electrode portion has a cut mark.

7. A method for fixing a cable to a substrate using the fixing device as recited in claim 1, the fixing method comprising:

connecting the first connection portion and the second connection portion to the first conductor and the second conductor, respectively;

connecting and fixing the first fixing portion and the second fixing portion to the first substrate fixing portion and the second substrate fixing portion, respectively; and after the connectinf and fixing, cutting off the coupling portion.

8. A structural body which is manufactured by the method as recited in claim 5, wherein:

the structural body comprises the cable, the substrate, the first electrode porion, and the second electrode portion; and each of the first electrode portion and the second electrode portion has a cut mark.

* * * * *